(12) United States Patent
Zante et al.

(10) Patent No.: US 8,052,100 B2
(45) Date of Patent: Nov. 8, 2011

(54) ADJUSTABLE TILT SOLAR PANEL SUPPORT SYSTEM

(75) Inventors: Anthony A. Zante, Fremont, CA (US); Monty Mullins, San Rafael, CA (US); Craig Stager, San Rafael, CA (US); Daniel S. Thompson, San Rafael, CA (US)

(73) Assignee: Thompson Technology Industries, Inc., Novato, CA (US)

( * ) Notice: Subject to any disclaimer, the term of this patent is extended or adjusted under 35 U.S.C. 154(b) by 426 days.

(21) Appl. No.: 12/160,129

(22) PCT Filed: Apr. 4, 2008

(86) PCT No.: PCT/US2008/059494
§ 371 (c)(1),
(2), (4) Date: Jul. 7, 2008

(87) PCT Pub. No.: WO2008/124642
PCT Pub. Date: Oct. 16, 2008

(65) Prior Publication Data
US 2010/0243827 A1    Sep. 30, 2010

Related U.S. Application Data

(60) Provisional application No. 60/910,202, filed on Apr. 4, 2007.

(51) Int. Cl.
*G01C 21/02*    (2006.01)
*H01L 31/042*    (2006.01)
(52) U.S. Cl. .................. 248/122.1; 248/178.1; 126/600; 136/246

(58) Field of Classification Search ............... 248/122.1, 248/188.1, 176.1, 177.1, 178.1, 179.1; 250/203.4, 250/203.3; 136/246; 126/600
See application file for complete search history.

(56) References Cited

U.S. PATENT DOCUMENTS

| | | | |
|---|---|---|---|
| 4,995,377 A * | 2/1991 | Eiden | 126/605 |
| 6,089,224 A | 7/2000 | Poulek | |
| 6,563,040 B2 | 5/2003 | Hayden et al. | |
| 6,960,717 B2 * | 11/2005 | Stuart et al. | 136/246 |
| 7,357,132 B2 * | 4/2008 | Hayden | 126/604 |
| 7,554,030 B2 * | 6/2009 | Shingleton | 136/246 |
| 2004/0238025 A1 | 12/2004 | Shingleton | |
| 2010/0294337 A1 * | 11/2010 | Sherman et al. | 136/246 |
| 2011/0099923 A1 * | 5/2011 | Ventura et al. | 52/173.3 |

FOREIGN PATENT DOCUMENTS

WO    WO 2007038760 A2 *    4/2007

* cited by examiner

*Primary Examiner* — Anita M King
(74) *Attorney, Agent, or Firm* — Craig M. Stainbrook; Stainbrook & Stainbrook, LLP

(57) ABSTRACT

An adjustable tilt solar panel support system including a support post, a U-shaped pivot bracket attached to the support post in a generally upright orientation and having a pivot pin hole for accommodating a pivot pin, and further having at least one adjustment opening; a rotational support cradle having a pivot pin hole in alignment with the pivot pin hole of the pivot bracket, such that the support cradle is pivotally attached to the pivot bracket, the support cradle further including at least one adjustment opening which aligns with the adjustment opening of the pivot bracket. An adjustment pin is selectively inserted into and through the adjustment openings of the support cradle and pivot bracket to secure the support cradle at a selected angle, and wherein the removal of the adjustment pin permits the rotational support cradle to pivot on the pivot bracket about the pivot pin.

9 Claims, 4 Drawing Sheets

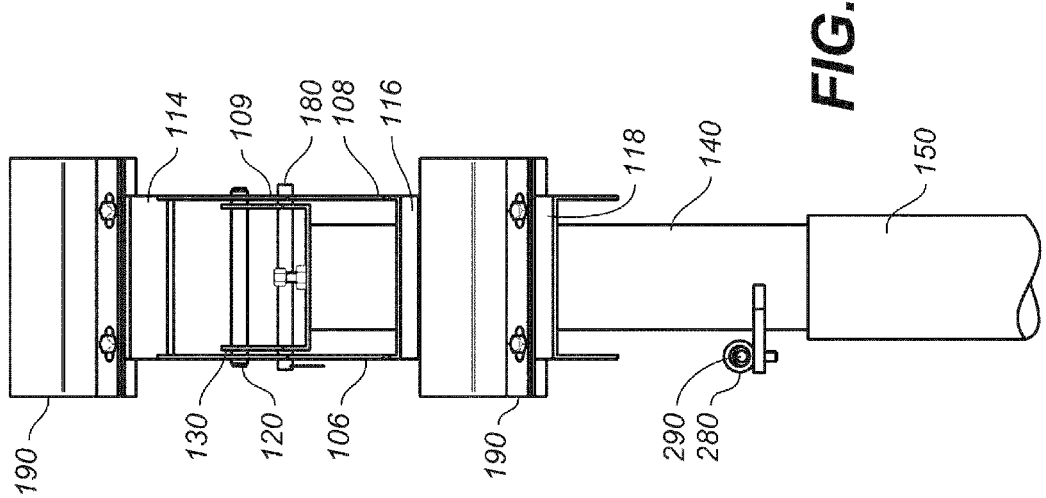
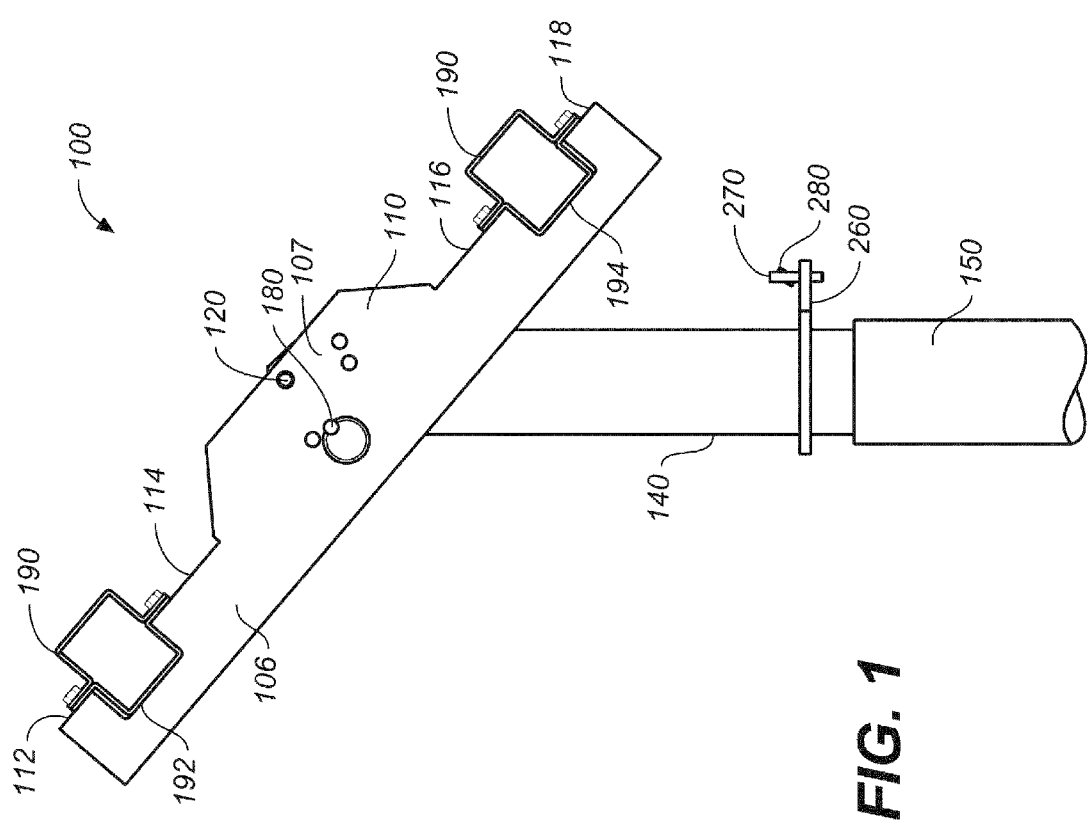

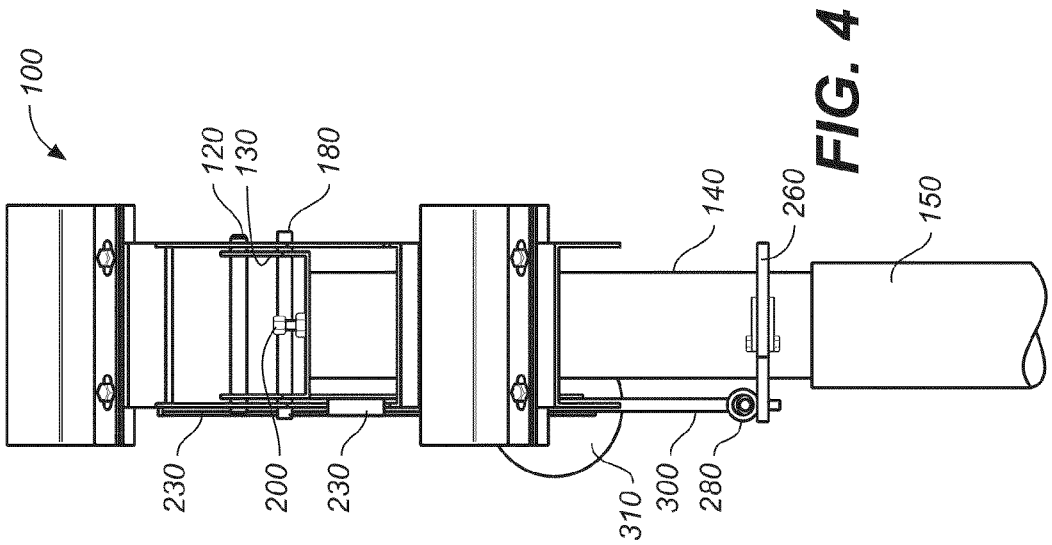
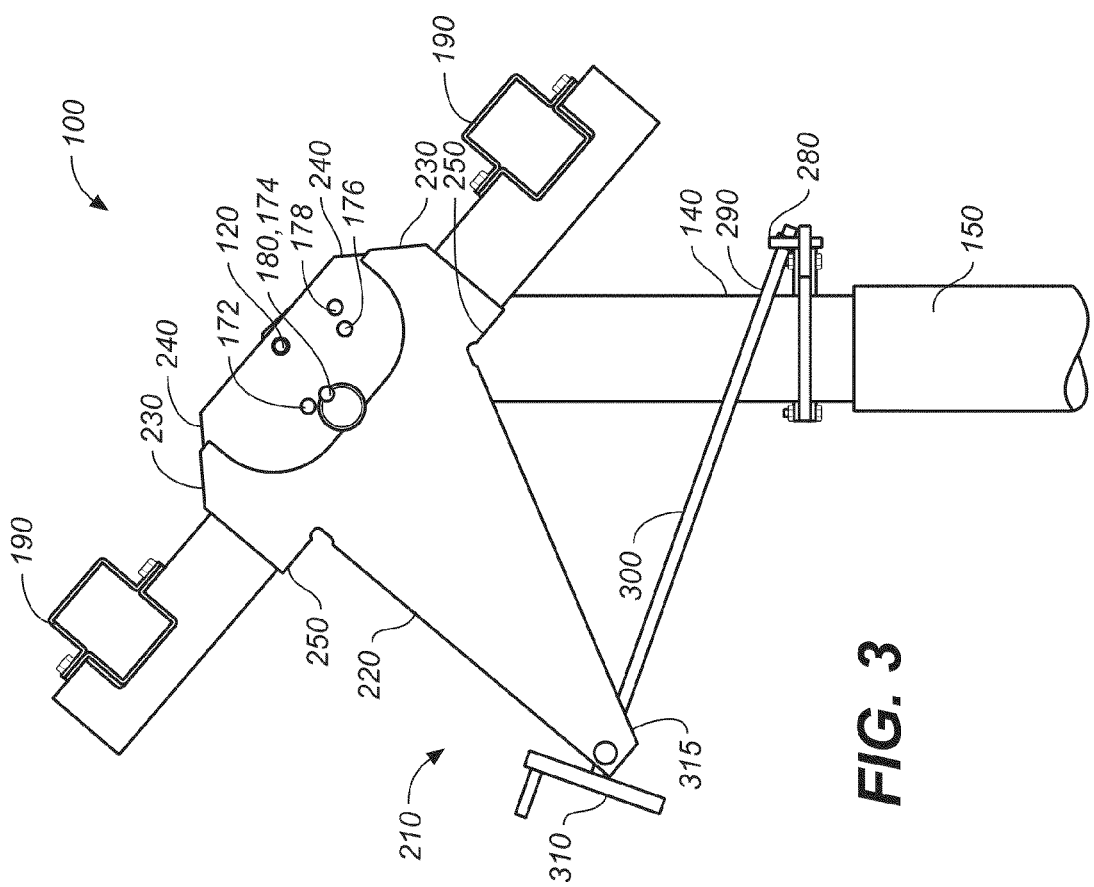

ADJUSTABLE TILT SOLAR PANEL SUPPORT SYSTEM

BACKGROUND OF THE INVENTION

1. Technical Field

The present invention relates generally to solar panel photovoltaic systems, and more particularly to solar panel array installations, and still more particularly to an adjustable tiltable support apparatus for a solar panel module array.

2. Background Art

Numerous kinds of support apparatus for solar panels are well known. Indeed, the present inventors have contributed significantly to the field, including disclosure of a solar panel array sun tracking system that describes a support cradle employed in the present invention. That inventive system was disclosed International Patent Application Serial Number PCT/US06/38185, and it is incorporated by reference in its entirety herein.

Known published documents in the prior art include U.S. Pat. No. 6,563,040, to Hayden et al., which describes a tracking system tilted in a fixed southerly orientation. The tilt is fixed and is rotated east to west to track the diurnal arc of the sun.

U.S. Patent Application Publication No. 2004/0238025. A1, by Shingleton et al., describes a tiltable solar panel array system in which the tilt is fixed. It, too, is rotated to track the diurnal arc of the sun. The assembly includes southside supports, north side supports and support structures, each having pivotal support points defining a tilt axis and at least one solar collector mounted on the structures. The assembly further includes apparatus that makes the collector support structures and the solar collectors tilt in unison.

U.S. Pat. No. 6,089,224, to Poulek, shows an apparatus for automatic, motorized orientation of solar radiation collectors. It includes one or more solar cells fixed to a rotary axle of the apparatus and connected directly to an electromotor joined with a rotary axle. The solar cell is arranged on the rotary axle in such a way that a plane of the solar cell is inclined by an angle between 0.1. degrees and 45. degrees from a plane perpendicular to the collectors of solar energy and parallel with the rotary axle apparatus in a direction opposite to the direction of sun movement. The solar cell is connected to the electromotor for orientation of the rotary axle and an associated orientation of the radiation collectors as long as the power of the solar cell is higher than the power necessary for orientation of the rotary axle.

Solar modules in collector arrays that do not follow the motion or position of the Sun are known as fixed tilt systems. Solar modules in fixed tilt systems are generally mounted on stationary structures to have an angle of inclination set to optimize the capture of sunlight throughout the day and throughout the year. Depending on the latitude of the array location, the angle of inclination may vary substantially. Further, as the Sun's position changes during the year (or more accurately, as the angle between the Earth's axis and the Earth-Sun line changes throughout the year), the capture efficiency of a solar module in a fixed title system is significantly affected, at times adversely.

Accordingly, fixed tilt solar power systems are closely analyzed to determine the module angular position with the highest solar yield so that the support system can be constructed accordingly. Once the angle of inclination is determined, the support structure can be specified and constructed. Such assemblies consist of combinations of structural materials, typically including a concrete base structure, structural steel members such as channels and angles to support the modules and to set the angle of inclination, and struts or channels to mount the modules. The structures are welded and/or bolted into frameworks to provide rigid support for the modules.

Although this method of support provides the necessary support structure for operation of a solar panel or panel array, there are a number of limitations. Notably, a fixed tilt stationary mounting system is (by definition) fixed. It therefore cannot be adjusted for seasonal changes in the Sun's relative position, and this dramatically limits solar collection efficiency.

Next, in a fixed tilt system the angle of inclination must be determined based on the latitudinal position of the solar array. Therefore the design of the structure cannot be finalized until the construction site is precisely known.

Next, with few exceptions, the angular position of the structure requires that the modules be mounted in an unstable orientation, and this may cause additional assembly effort as well as increase the potential for damage to the modules.

The foregoing prior art devices and patents reflect the current state of the art of which the present inventors are aware. Reference to, and discussion of, these patents is intended to aid in discharging Applicants' duties of candor in disclosing information during examination that may be materially relevant to the allowability of claims to the present invention. However, it is respectfully submitted that none of the above-indicated patents or prior art apparatus discloses, teaches, suggests, shows, or otherwise renders obvious, either singly or when considered in combination, the invention described herein.

DISCLOSURE OF INVENTION

The adjustable tilt system of the present invention provides an inexpensive and elegant solution to the foregoing problems. The inventive system includes the following objects, advantageous, characteristics, and features:

It is a first and principal object of the present invention to provide an adjustable tilt solar panel support that can be set for the best angular position to optimize solar collection.

It is another object of the present invention to provide an adjustable tilt solar panel support that permits a solar module array to be adjusted from time to time to optimize solar collection throughout the seasonal changes.

It is yet another object of the present invention that the above-described adjustments be easily accomplished using a simple angular adjustment tool forming a part of the inventive system.

A still further object of the present invention is to provide an adjustable tilt solar panel support that eliminates the need to build and fix a solar panel array at a specified angle.

Another object of the present invention is to provide an adjustable tilt solar panel support that can be mounted in a system arrangement on a group of micropile posts using existing support technology with adjustable height inserts for ease of assembly.

Yet another object of the present invention is to provide an adjustable tilt solar panel support that may be set at a horizontal position to ensure safe and easy assembly of solar panel modules on the support system.

Summarily, a principal object and advantage of the present invention is to provide a stationary solar panel mounting system with means to effect and easy, manual adjustment of a solar panel array to the Sun's southern exposure without the need for motorized apparatus.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there is illustrated the preferred embodiment and best mode of practicing the invention.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view in elevation showing the structural elements of the support cradle employed in the present invention, showing the rotational support beams removed for clarity;

FIG. 2 is a schematic front view in elevation thereof;

FIG. 3 is a schematic side view in elevation showing the support cradle having the angular adjustment tool of the present invention installed for an adjustment procedure;

FIG. 4 is a schematic front view in elevation thereof;

BEST MODE FOR CARRYING OUT THE INVENTION

Figure 5:
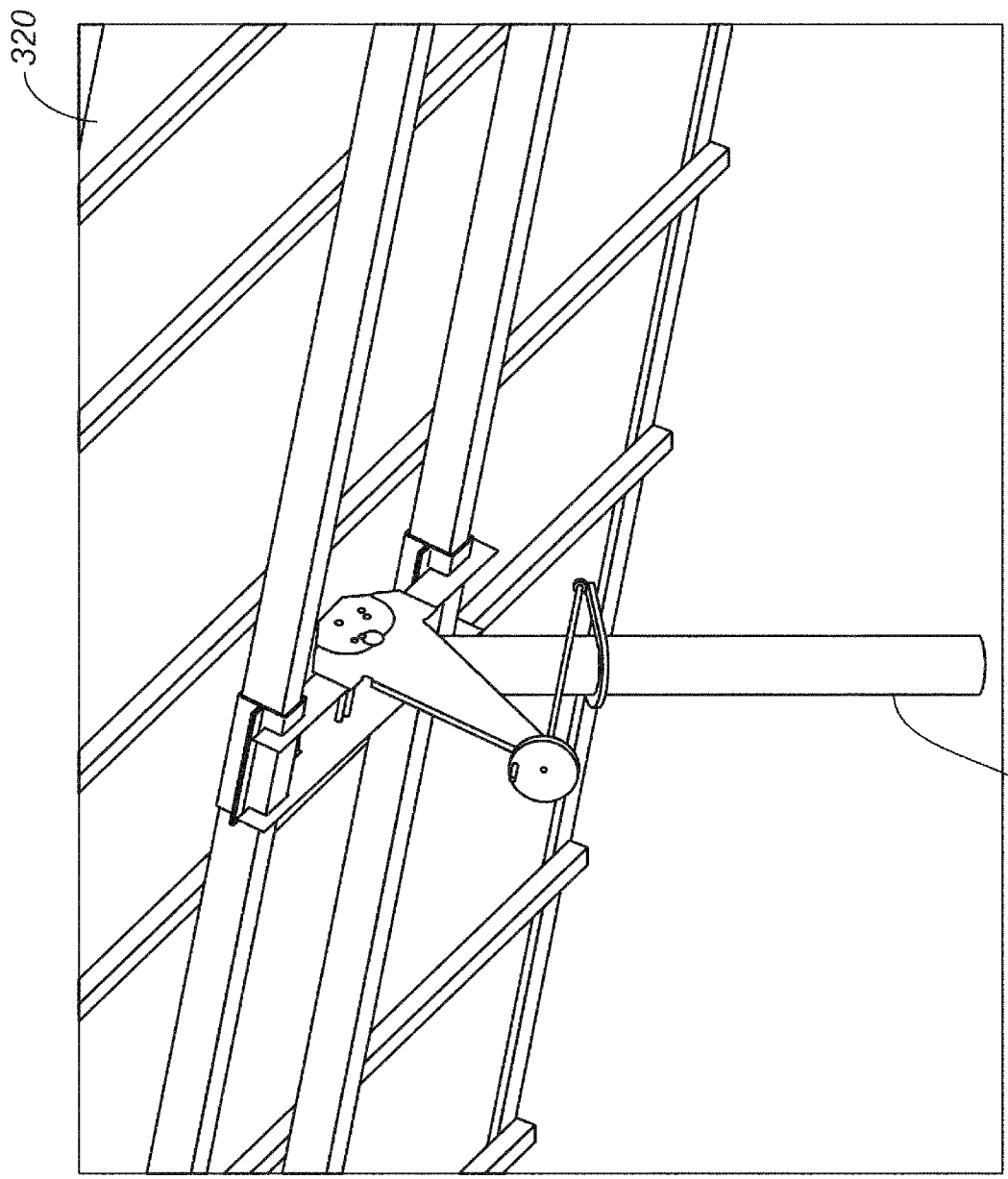
FIG. 5 is a lower rear perspective view showing the adjustable tilt solar panel support system with solar panels mounted on the support cradle.

Referring to FIGS. 1 through 6, wherein like reference numerals refer to like components in the various views, there is illustrated therein a new and improved adjustable tilt solar panel support apparatus, generally denominated 100 herein.

The inventive apparatus includes a rotational support cradle 110, which is the primary rotational and adjustment element of the system. The rotational support cradle, in its most essential aspect, comprises substantially planar parallel elongate side bars 106, 108, joined by a plurality of cross bars 112, 114, 116, 118. Each side bar preferably includes an expanded medial portion 107, 109, so as to accommodate the adjustment features described below. Using a pivot pin 120 the rotational support cradle is mounted to a pivot bracket 130, which in turn is attached to a support post or cinch tube 140 adjustably inserted into, and secured in, a piling 150. The cinch tube includes either an expander or wedge at its lower end and either an angled lower end (for use with the wedge) or a slotted lower end (for use with an expander). The expander or wedge is brought into engagement with the lower end of the cinch tube and tightened with a connecting bolt, and thereby operates in the manner of a bicycle handlebar stem to provide vertical adjustability within the piling tube.

The rotational support cradle, preferably fabricated from structural steel, is used to mount and rotate rotational support beams 160 about the pin axis to a desired angle of inclination. The side bars of the rotational support cradle include a plurality of aligned angle adjustment holes 172, 174, 176, 178, in an arcuate array, such that as the rotational support cradle is rotated relative to the pivot bracket, the angle adjustment holes can be aligned in various angular positions for insertion of an alignment pin 180. The series of angle adjustment holes preferably includes four or five pairs of holes, including the main pivot pin holes, that allow setting the rotational support cradle position at the desired angles of inclination. Those positions preferably include stops at various angle settings, in this instance 10. degrees 172, 20, degrees 174, 30. degrees 176, and 40. degrees 178. As will be immediately appreciated, however, any of a number of settings for the angle adjustment holes may be provided. Alternatively, continuous and arcuate angle adjustment slots may be cut in the side bars, though setting and maintaining the angle of the rotational support cradle would then entail using fasteners or other stop means, and potentially the application of significant forces on the rotational support cradle 110 and the bracket 130. Such forces could compromises the advantages gained by the infinite adjustability of a slot and makes such an arrangement structurally disadvantageous. Further, because such an arrangement may entail the use of fasteners rather than pins, adjustments would be significantly more involved and time consuming.

Figure 6:
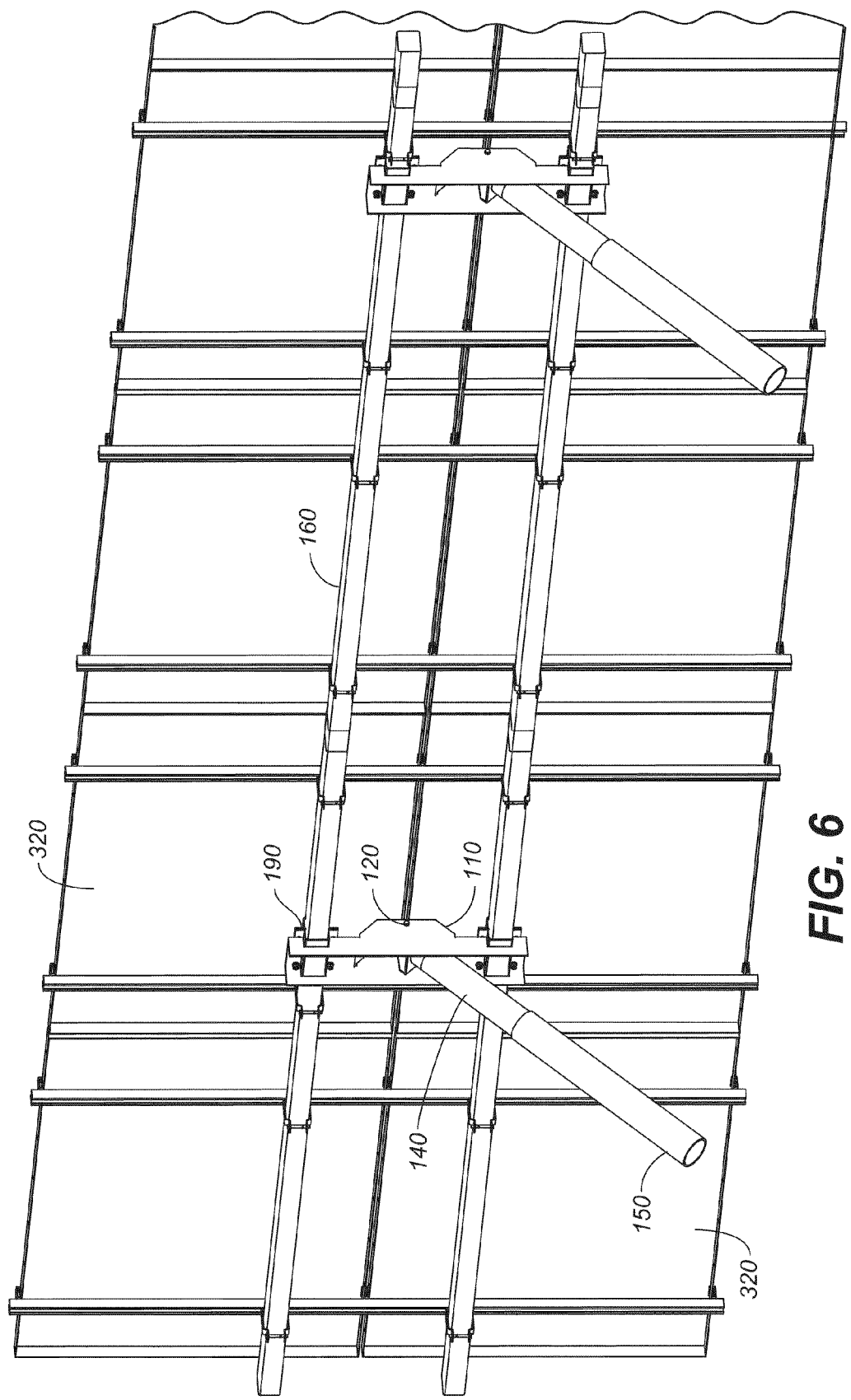
FIG. 6 is a lower rear perspective view showing two adjustable tilt support systems supporting solar panels in a tilted orientation before or after adjustment.

The rotational support beams 160 are preferably rectangular or square in cross section and span the distance between adjacent rotational support cradles in a solar panel support array (see FIG. 6). They are captured and secured to the upper portion of the rotational support cradles with splice clamps 190, which span transversely across the support cradle side bars where they are welded, bolted, or otherwise secured in upper and lower sets of cutouts 192, 194, in the upper edges of the rotational support cradle side bars. The cutout sets conform in shape to the splice clamps disposed in the cutouts, which in turn correspond to the cross-sectional shape of the rotational support beams, and the assembly thus functions as the principal support members for the solar panel array.

The pivot bracket is a U-shaped bracket used to connect the rotational support cradle by means of a pivot pin to the post or piling by means of a slotted hole and cinch tube connecting bolt 200. It includes two or more angular positioning holes in its vertical sides to accommodate the alignment pin.

To adjust the angle of the tiltable solar panel support system a special angular adjustment tool 210 is first installed on the rotational support cradle. The adjustment tool includes an arm 220 having two angled fingers 230 that fit over the medial shoulders 240 on one side of the rotational support cradle, and two angled base elements 250 that fit under the side of the rotational support cradle to provide a firm grip for rotating and adjusting the rotational support cradle about its pivot pin 120.

Next, an adjustment bracket 260 is installed on the cinch tube 140 or piling post 150. This bracket provides a platform for hosting an eye hook 270 with a swivelable threaded female element 280 which receives a male end 290 of a threaded adjustment rod 300. An adjustment knob 310 is disposed at the other end of the adjustment rod. The adjustment rod is pivotally connected to the lower end 315 of arm 220 so that it can be rotated freely at the connection point.

To complete an angle adjustment, the adjustment rod is installed and inserted into the swivelable threaded female element 280, and the adjustment knob is then turned until the rod bears the weight of the solar panel 320 and the alignment pin is free to be removed. After removing the adjustment pin, adjustments to the angle of the rotational support cradle can be made easily and quickly simply by turning the adjustment knob. The knob is turned until the next desired setting is reached and the angle adjustment hole is aligned with the hole in the pivot bracket. The adjustment pin is then reinserted and the rotational support cradle is secured in at its new position.

Referring now to FIG. 6, when panels are mounted in an array on a plurality of aligned pilings (support posts) and rotational support cradles, the rotational support cradles are structurally and operatively connected to one another using the rotational support beams and clamped in place with the end caps. Once the rotational support beams connect the rotational support cradles, an entire row of mounted solar panels can be rotated in unison about their respective pivot pins' shared axes of rotation. FIG. 6 shows a lateral mounting structure for a solar panel array that allows a group of modules or side-by-side panels 320 to be mounted on rotational support beams (i.e., rails) 160 and deployed on each side of a cinch tube 140 and piling 150, generally with pairs of side-by-side panels mounted in series in an end-to-end fashion. Because of the lengths of the panels and their support structures, and because the panels are rotated and adjusted in coordination, substantial support structure is required, and this typically calls for two or more rotational support beams 160, shown herein as substantially square tubes. Other support structure can be provided, including rectangular tubes, round tubes, pipe, I-beams, and channels. The mounting rails are affixed to a plurality of the rotational support cradles 110 which are attached to cinch tubes 140, which are in turn adjustably inserted into and secured in pilings 150 anchored in the ground and arranged in rows at a nominal spacing of 12. to 17. feet. The distance between pilings can be varied over a wider range if the panel mounting rails are sized accordingly. The rotational support beams 160 are mounted to the cinch tubes 140 by means of the rotational support cradle 110 and splice clamps 190 that clamp the rotational support beams to the rotational support cradle 110. The rotational support cradle 110 is pivotally hinged on the cinch tubes 140 via the pivot bracket 130 and pivot pin 120, which are aligned with the solar panel axis of rotation.

This simple adjustment device can be used to adjust cylindrical solar collectors that already have single axis tracking for the east west movement but are currently in a fixed southern exposure angle.

This manual angular adjustment of a ganged array could be used to shift a group of assembly or inspection tables to facilitate these processes. And angular adjustments can be accomplished at any time by a single operator. Therefore, changes in the angle of inclination throughout the seasons can be made within a few hours for even the largest of arrays.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which shall be defined by claims when and as filed.

What is claimed as invention is:

1. An adjustable tilt solar panel support system, comprising:
    a support post;
    a U-shaped pivot bracket attached to said support post in a generally upright orientation and having a pivot pin hole for accommodating a pivot pin and at least one adjustment opening;
    a rotational support cradle having a pivot pin hole in alignment with said pivot pin hole of said pivot bracket, such that said support cradle is pivotally attached to said pivot bracket, said support cradle further including at least one adjustment opening which aligns with said at least one adjustment opening of said pivot bracket;
    an adjustment pin selectively inserted into one of said at least one adjustment opening of said pivot bracket, wherein the removal of said adjustment pin permits said rotational support cradle to pivot on said pivot bracket about said pivot pin; and
    beam holders for securing support beams atop said rotational support cradle.

2. The apparatus of claim 1, wherein said support cradle comprises substantially parallel elongate side bars connected by a plurality of cross bars.

3. The apparatus of claim 2, wherein each of said side bars includes an expanded medial portion in which said adjustment holes are disposed.

4. The apparatus of claim 2, wherein said side bars of said rotational support cradle include a plurality of aligned angle adjustment holes in a generally arcuate array, such that as the rotational support cradle is rotated relative to the pivot bracket, the angle adjustment holes can be aligned in various angular positions for insertion of an alignment pin.

5. The apparatus of claim 2, wherein said side bars of said rotational support cradles each include an arcuate slot disposed in relation to said adjacent side bar, such that as said rotational support cradle is rotated relative to the pivot bracket, a fastener can be placed through the arcuate slots to secure said rotational support cradle in a selected angular orientation.

6. The apparatus of claim 1, wherein said support post comprises a cinch tube for vertically adjustable insertion into a ground anchored support piling.

7. The apparatus of claim 1, wherein said beam holders comprise clamps disposed atop said rotational support cradle.

8. The apparatus of claim 1, further including an angular adjustment tool comprising:
   an arm having two angled fingers that fit over medial shoulders on one of said side bars of said rotational support cradle, and two angled base elements that fit under the same of said side bars of said rotational support cradle so as to grip said side bar;
   an adjustment bracket installed on said support post and having a threaded female element proximate said support post for receiving a threaded male end of a rotatable adjustment rod, said adjustment rod having an adjustment knob disposed at its other end and being pivotally connected to a lower end of said arm at a pivotal connection point such that it can be rotated freely at said pivotal connection point as said knob is turned during adjustment operations.

9. The apparatus of claim 8, wherein said threaded female element is swivelable.

* * * * *